(12) United States Patent
Foerstner et al.

(10) Patent No.: US 7,857,508 B2
(45) Date of Patent: Dec. 28, 2010

(54) METHOD FOR MONITORING THE FUNCTIONALITY OF A TEMPERATURE SENSOR

(75) Inventors: Dirk Foerstner, Stuttgart (DE); Andreas Eckert, Renningen (DE); Siegfried Goetz, Crailsheim (DE); Joerg Neumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 573 days.

(21) Appl. No.: 11/793,836

(22) PCT Filed: Oct. 24, 2005

(86) PCT No.: PCT/EP2005/055484

§ 371 (c)(1), (2), (4) Date: Apr. 3, 2008

(87) PCT Pub. No.: WO2006/066988

PCT Pub. Date: Jun. 29, 2006

(65) Prior Publication Data

US 2009/0129430 A1 May 21, 2009

(30) Foreign Application Priority Data

Dec. 22, 2004 (DE) .................... 10 2004 061 815

(51) Int. Cl.
*G01K 1/00* (2006.01)
*G01M 15/00* (2006.01)

(52) U.S. Cl. ...................... 374/145; 374/137; 374/112; 374/1; 374/39; 374/166; 374/144; 60/286; 702/99; 702/130; 701/34; 162/42; 73/114.68; 73/114.77; 123/359

(58) Field of Classification Search ...................... 374/1, 374/4, 5, 29, 30, 39, 40, 45, 57, 100, 101–103, 374/112, 115, 134, 135, 137, 141, 144, 145, 374/166; 73/114.68, 114.77, FOR. 110; 165/42, 58, FOR. 101, 27, DIG. 6; 60/272, 60/277, 286, 320; 702/99, 130; 701/34, 701/97, 114; 123/41.01, 41.15, 350, 359, 123/378, 41.05, 41.12, 41.13
See application file for complete search history.

(56) References Cited

U.S. PATENT DOCUMENTS 4,774,910 A 10/1988 Aihara
(Continued)

FOREIGN PATENT DOCUMENTS

DE 4426494 2/1996
DE 10120968 11/2002

*Primary Examiner*—Gail Verbitsky
(74) *Attorney, Agent, or Firm*—Kenyon & Kenyon LLP

(57) ABSTRACT

In a method for monitoring the functionality of a temperature sensor that can deliver an electrical signal as a function of the measured temperature and is disposed, in particular, in the cooling water circuit of an internal combustion engine, the persistence of the temperature sensor in the high signal range is made possible by a method encompassing the following steps: Characterizing the sensor as possibly faulty if the sensor indicates, upon engine shutdown, at least a maximum value of the cooling fluid temperature; determining a first gradient of the cooling fluid temperature, measured by the possibly faulty sensor, up to a first point in time after engine shutdown, and characterizing the sensor as fault-free if the gradient exceeds a minimum value; determining a second gradient of the cooling fluid temperature, measured by the possibly faulty sensor, between the point in time and a point in time after engine shutdown, and characterizing the sensor as fault-free if the second gradient exceeds a minimum value; determining the cooling fluid temperature measured by the possibly faulty sensor at a point in time after engine shutdown, and characterizing the sensor as fault-free if the cooling fluid temperature falls below a maximum value.

3 Claims, 2 Drawing Sheets

U.S. PATENT DOCUMENTS

| | | | |
|---|---|---|---|
| 6,690,016 B1* | 2/2004 | Watkins et al. | 250/341.7 |
| 7,069,141 B2* | 6/2006 | Kunz et al. | 701/114 |
| 7,168,397 B2* | 1/2007 | Chanfreau et al. | 123/41.01 |
| 2004/0184507 A1 | 9/2004 | Tsukamoto et al. | |
| 2007/0047616 A1* | 3/2007 | Izumiura et al. | 374/144 |
| 2008/0115487 A1* | 5/2008 | Harada et al. | 60/320 |
| 2008/0253429 A1* | 10/2008 | Choi et al. | 374/144 |
| 2008/0262673 A1* | 10/2008 | Hamama et al. | 701/34 |
| 2009/0003405 A1* | 1/2009 | Corbet et al. | 374/1 |
| 2009/0090097 A1* | 4/2009 | Gaskins | 60/277 |
| 2009/0129430 A1* | 5/2009 | Foerstner et al. | 374/1 |
| 2009/0168832 A1* | 7/2009 | Bauerle | 374/1 |
| 2010/0058848 A1* | 3/2010 | Hamama et al. | 73/114.68 |
| 2010/0067560 A1* | 3/2010 | Kouda et al. | 374/145 |
| 2010/0195782 A1* | 8/2010 | Ishii et al. | 376/247 |

* cited by examiner

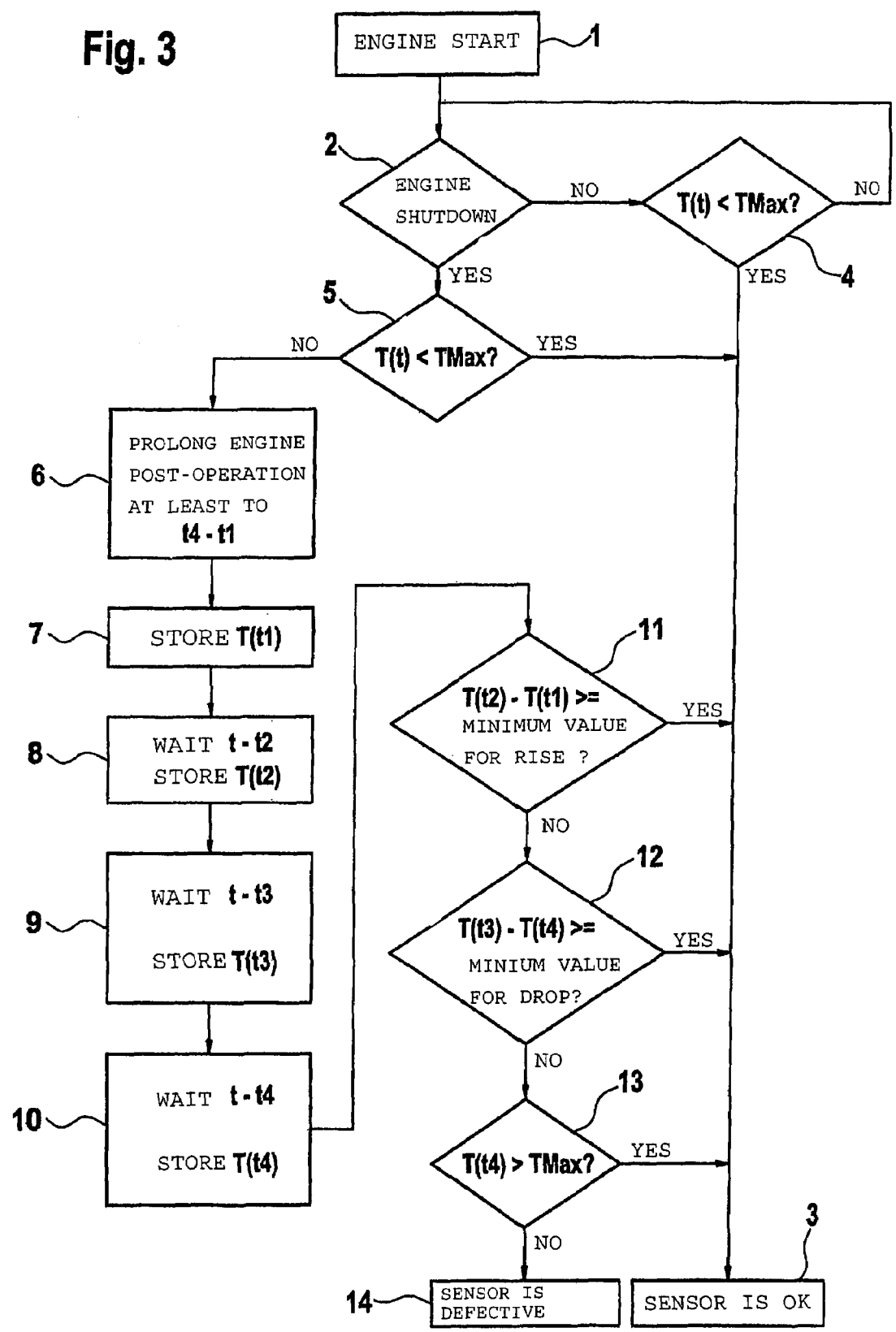

METHOD FOR MONITORING THE FUNCTIONALITY OF A TEMPERATURE SENSOR

FIELD OF THE INVENTION

The present invention relates to a method for monitoring the functionality of a temperature sensor.

BACKGROUND OF THE INVENTION

Sensors that are used for engine control of an internal combustion engine must be monitored in order to ensure safety and emissions compliance during operation. A check must be made, inter alia, of the cooling water temperature sensor to determine whether it is stuck in a high temperature range and is thus continuously signaling too high a cooling fluid temperature.

It is known to monitor the signals of the cooling water temperature sensor in terms of signal limit values, using the control unit software. It is furthermore known to monitor whether, after an engine start, a minimum value is reached or a minimum signal change occurs ("dynamic plausibilization").

It is known from German Patent Publication No. DE 101 20 968 to check during operation whether a change in the cooling water temperature occurs upon a transition from a low to a high load range. If not, a fault is reported.

German Patent Publication No. DE 44 26 494 discloses the monitoring of a cooling temperature sensor and of a thermostat by monitoring the change over time in the temperature sensor. If that change is too great, a fault is detected. The temperature behavior upon engine startup and under specific driving conditions, such as idling, is additionally checked, on the one hand based on typical rises in cooling temperature after engine startup, and on the other hand by means of a comparison with other signals.

With the methods of the existing art, it is not possible to monitor a sensor, in particular a temperature sensor, for a persistence in the high signal range or to identify this fault ("high side check").

It is therefore the object of the present invention to describe a method that detects a persistence of a sensor, in particular a cooling water sensor, in the high signal range.

SUMMARY OF THE INVENTION

This problem is solved by a method for monitoring the functionality of a temperature sensor that can deliver an electrical signal as a function of the measured temperature and is disposed, in particular, in the cooling water circuit of an internal combustion engine, encompassing the steps of: characterizing the sensor as possibly faulty if the sensor indicates, upon engine shutdown, at least a maximum value of the cooling fluid temperature; determining a first gradient of the cooling fluid temperature, measured by the possibly faulty sensor, up to a first point in time after engine shutdown, and characterizing the sensor as fault-free if the gradient exceeds a minimum value; determining a second gradient of the cooling fluid temperature, measured by the possibly faulty sensor, between the point in time and a point in time after engine shutdown, and characterizing the sensor as fault-free if the second gradient exceeds a minimum value; determining the cooling fluid temperature measured by the possibly faulty sensor at a point in time after engine shutdown, and characterizing the sensor as fault-free if the cooling fluid temperature falls below a maximum value.

What is monitored is a sensor that assumes a higher value in normal operation than in the context of a cold start, and decreases back to an ambient value after engine shutdown. This is typically the case for temperature sensors, in particular in the context of cooling water temperature. Only the one sensor signal is evaluated for monitoring purposes; further comparison signals are not needed. A monitoring result is available after each driving cycle; specific operating conditions or long non-operating times need not be accommodated. It is not necessary to wait for complete cooling of the engine, which moreover would be difficult to detect or would require a clock to run in order to measure non-operating time. Monitoring occurs specifically to determine whether the sensor persists in a high signal range.

In a refinement of the method according to the present invention, provision is made for engine post-operation to be prolonged if the sensor is characterized as possibly faulty. Prolongation of engine post-operation ensures that the sensor and the electrical components necessary for carrying out the method, e.g. parts of a control unit, remain operational.

In a refinement of the method according to the present invention, provision is made for the sensor to be characterized as possibly faulty if it continuously indicates, prior to engine shutdown, at least the maximum value of the cooling fluid temperature. "Continuously" is understood here to mean a long period of time, e.g. several minutes.

BRIEF DESCRIPTION OF DRAWINGS

An exemplifying embodiment of the present invention will be explained in more detail below with reference to the appended drawings, in which:

FIG. 3 is a flow diagram of the method.

DESCRIPTION

Figure 1:
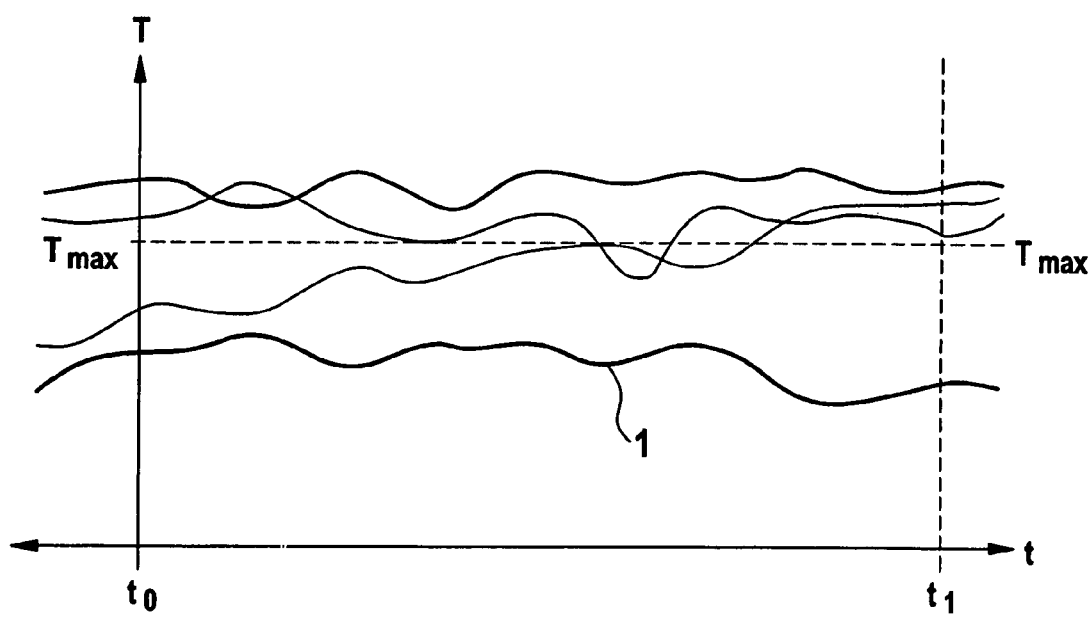
FIG. 1 shows examples of temperature profiles.
Figure 2:
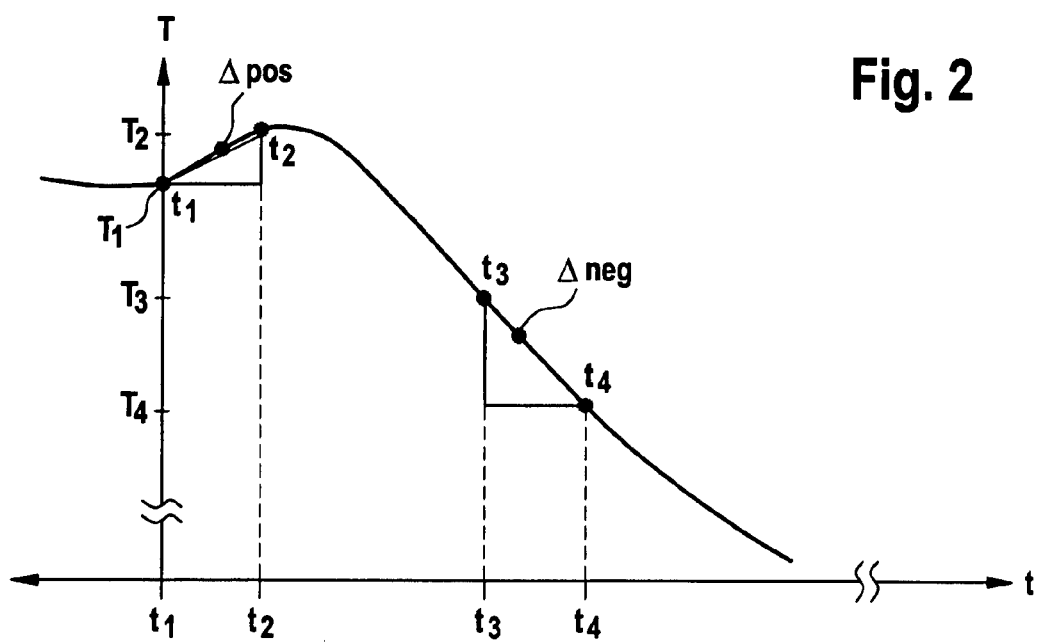
FIG. 2 shows the temperature profile measured by the sensor after engine shutdown.

FIG. 1 shows an example of possible signal profiles of a temperature sensor during operation of an internal combustion engine over time. The temperature T measured by a sensor is depicted, as a function of time t. The temperature sensor is one in the cooling fluid circuit of an internal combustion engine, which sensor converts the measured cooling fluid temperature into an electrical signal. FIGS. 1 and 2 depict the sensor signal as delivered and as converted into a temperature. When a temperature T is referred to in the context of FIGS. 1 and 2, what is therefore meant is the temperature measured by the sensor and indicated, not the real temperature actually present in the cooling circuit. The depictions in FIGS. 1 and 2 are therefore basically to be interpreted as the electrical output variables of the temperature sensor.

Four examples of temperature profiles over time are depicted in FIG. 1. A maximum temperature Tmax is plotted as a horizontal dashed line. Four different curves are depicted, characterized with numbers 1, 2, 3, and 4. Curve 1 proceeds continuously below the maximum temperature Tmax. Curve 2 proceeds largely below the maximum temperature Tmax, and exceeds the temperature Tmax shortly before a time t1 that characterizes engine shutdown. Curve 3 continuously exceeds the maximum temperature except for a short period of time, and curve 4 continuously exceeds the maximum temperature. The time t1 is engine shutdown, i.e. the internal combustion engine is switched off.

During so-called engine post-operation, which follows engine shutdown and in which certain electrical components are operated even after engine shutdown, the temperature sensor for the cooling fluid is also subjected to a plausibility test. Firstly a determination is made as to whether the sensor is possibly faulty. This determination can be performed according to two different criteria. On the one hand, the criterion employed can be whether the temperature measured by the sensor at engine shutdown t1 is above the maximum temperature Tmax. If so, it is assumed that the sensor is possibly persisting in the high signal range, and is continuously measuring too high a temperature. In the examples of FIG. 1, this would be the case for curves 2, 3, and 4. Alternatively, it is possible to check whether the sensor is continuously exceeding the maximum value over a certain measurement time period, which is characterized in FIG. 1 by times t0 and t1 and can last, for example, several minutes or even longer. In the examples of FIG. 1, this is the case only for temperature curve 4. With the two aforementioned alternatives, firstly a determination is made as to whether the sensor is possibly faulty and might be persisting in the high temperature indicating range. The manner in which this hypothesis is verified or falsified will be described below.

FIG. 2 depicts the temperature profile measured by the sensor after engine shutdown. At fixed times t1, t2, t3, and t3 stored, for example, in a control unit, or at times t1 to t4 ascertained on the basis of operating parameters, the respective temperatures T measured by the sensor are measured and are stored in a memory cell of, for example, the control unit. Temperature T1 is associated with time t1, temperature T2 with time t2, etc. What is depicted, as in FIG. 1, is the signal as a function of time that is furnished by the sensor and converted to a temperature value. Usually the temperature measured by the sensor first rises briefly after engine shutdown; this behavior occurs, for example, because of the stored heat of the internal combustion engine. A temperature gradient $\Delta T1=(T2_2-T1)_1/(t2-t1)$ is therefore initially ascertained between engine shutdown t1 and a first time t2 located thereafter. If this gradient is above a positive minimum value, it is assumed that the sensor is fault-free.

A second temperature gradient $\Delta t_2=(T4-T3)/(t4-t3)$ is then ascertained. If the second temperature gradient $\Delta T_2$ is above a negative minimum value, the sensor is classified as fault-free. Lastly, a determination is made as to whether at time t4, the temperature T4 is below a maximum value defined for temperature T4. If so, the sensor is once again classified as fault-free.

FIG. 3 shows the entire method as a flow diagram. The method begins at a step 1 upon engine startup. Until engine shutdown in step 2, monitoring occurs continuously to determine whether the temperature T(t) is less than the temperature Tmax. If so, in a step 3 the sensor is classified as functional and fault-free. If not, the loop is cycled through again until the "Engine shutdown" condition in step 2 is met (Yes). A further checking step 4 checks whether at the moment of engine shutdown, temperature T(t) is less than the temperature Tmax. If so, execution once again branches to step 3 and thus to a fault-free sensor. If not, then in a step 6 firstly the engine post-operation phase is prolonged to at least the value t4−t1. The value T(t1) is then stored in a seventh step. After the time period up to time t2 has elapsed, in step 8 the temperature T(t2) at that point in time is also stored. In a step 9, the temperature T(t3) at time t=t3 is stored, and correspondingly in a step 10 the temperature T(t4) at t=t4 is stored. A step 11 then checks whether the temperature gradient T(t2)−T(t1) between times t1 and t2 is greater than or equal to the minimum value for the increase. If so, the sensor is classified in step 3 as fault-free; if not, a step 12 then checks whether the temperature gradient T(t4)−T(t3) between times t3 and t4 is greater than or equal to the minimum value for the temperature drop in this time period. If so, the sensor is then classified in step 3 as fault-free; if not, a step 13 then checks whether the temperature T(t4) at time t4 is less than a temperature Tmax (t4). If so, the sensor is once again classified in step 3 as fault-free; if that is once again not the case, in a step 14 the sensor is finally characterized as defective.

What is claimed is:

1. A method for monitoring the functionality of a temperature sensor that can deliver an electrical signal as a function of the measured temperature and is disposed, in particular, in the cooling water circuit of an internal combustion engine, comprising:

characterizing the sensor as possibly faulty if the sensor indicates, upon engine shutdown, at least a maximum value of the cooling fluid temperature;

determining a first gradient of the cooling fluid temperature, measured by the possibly faulty sensor, up to a first point in time after engine shutdown, and characterizing the sensor as fault-free if the gradient exceeds a minimum value;

determining a second gradient of the cooling fluid temperature, measured by the possibly faulty sensor, between the point in time and a point in time after engine shutdown, and characterizing the sensor as fault-free if the second gradient exceeds a minimum value; and determining the cooling fluid temperature measured by the possibly faulty sensor at a point in time after engine shutdown, and characterizing the sensor as fault-free if the cooling fluid temperature falls below a maximum value.

2. The method as recited in claim 1, wherein engine post-operation is prolonged if the sensor is characterized as possibly faulty.

3. The method as recited in claim 1, wherein the sensor is characterized as possibly faulty if it continuously indicates, prior to engine shutdown, at least the maximum value of the cooling fluid temperature.

* * * * *